(12) United States Patent
Childs et al.

(10) Patent No.: US 9,673,702 B2
(45) Date of Patent: Jun. 6, 2017

(54) NEGATIVE CURRENT CLOCKING

(71) Applicant: Dialog Semiconductor GmbH, Kirchheim/Teck-Nabern (DE)

(72) Inventors: Mark Childs, Swindon (GB); Paul Collins, Swindon (GB)

(73) Assignee: Dialog Semiconductor (UK) Limited, Reading (GB)

( * ) Notice: Subject to any disclaimer, the term of this patent is extended or adjusted under 35 U.S.C. 154(b) by 188 days.

(21) Appl. No.: 14/260,516

(22) Filed: Apr. 24, 2014

(65) Prior Publication Data
US 2015/0303800 A1 Oct. 22, 2015

(30) Foreign Application Priority Data
Apr. 16, 2014 (EP) .................................. 14392002

(51) Int. Cl.
H02M 3/158 (2006.01)
H02M 1/32 (2007.01)

(52) U.S. Cl.
CPC ............. *H02M 3/158* (2013.01); *H02M 1/32* (2013.01); *H02M 3/1588* (2013.01); *Y02B 70/1466* (2013.01)

(58) Field of Classification Search
CPC ....... H02M 3/1588; H02M 2003/1566; H02M 2001/0032; H02M 2001/0019; H02M 3/158
See application file for complete search history.

(56) References Cited

U.S. PATENT DOCUMENTS

| 7,095,220 | B2 | 8/2006 | Kernahan | |
| 7,443,699 | B2 | 10/2008 | Lhermite | |
| 8,222,879 | B2 | 7/2012 | Nguyen | |
| 2004/0036458 | A1 | 2/2004 | Johnson et al. | |
| 2006/0279970 | A1 | 12/2006 | Kernahan | |
| 2008/0067989 | A1* | 3/2008 | Kasai | H02M 3/1588 323/271 |
| 2011/0304308 | A1* | 12/2011 | Wan | H02M 3/1588 323/282 |
| 2012/0091978 | A1 | 4/2012 | Ishii | |
| 2012/0212195 | A1* | 8/2012 | Kushida | H02M 3/1588 323/271 |

FOREIGN PATENT DOCUMENTS

| EP | 0 257 404 | 3/1988 |
| WO | WO 01/82020 | 11/2001 |

OTHER PUBLICATIONS

Co-pending US Patent DS12-053, U.S. Appl. No. 14/260,523, filed Apr. 24, 2014, Buck Variable Negative Current, by Mark Childs, 17 pgs.
European Search Report 14392002.3-1809, Oct. 16, 2014, Dialog Semiconductor GmbH.

* cited by examiner

*Primary Examiner* — Harry Behm
(74) *Attorney, Agent, or Firm* — Saile Ackerman LLC; Stephen B. Ackerman; Billy Knowles

(57) ABSTRACT

A switching mode power supply (SMPS) is capable of clearing an overvoltage condition. The overvoltage is determined by detecting that the output voltage has exceeded the input voltage by a limited amount. The overvoltage is cleared by repetitively turning on and then off the switches controlling the flow of energy to the SMPS in sequence until the excess charge resulting from the overvoltage is couple to circuit ground, and the output is reduced to within acceptable limits.

27 Claims, 4 Drawing Sheets

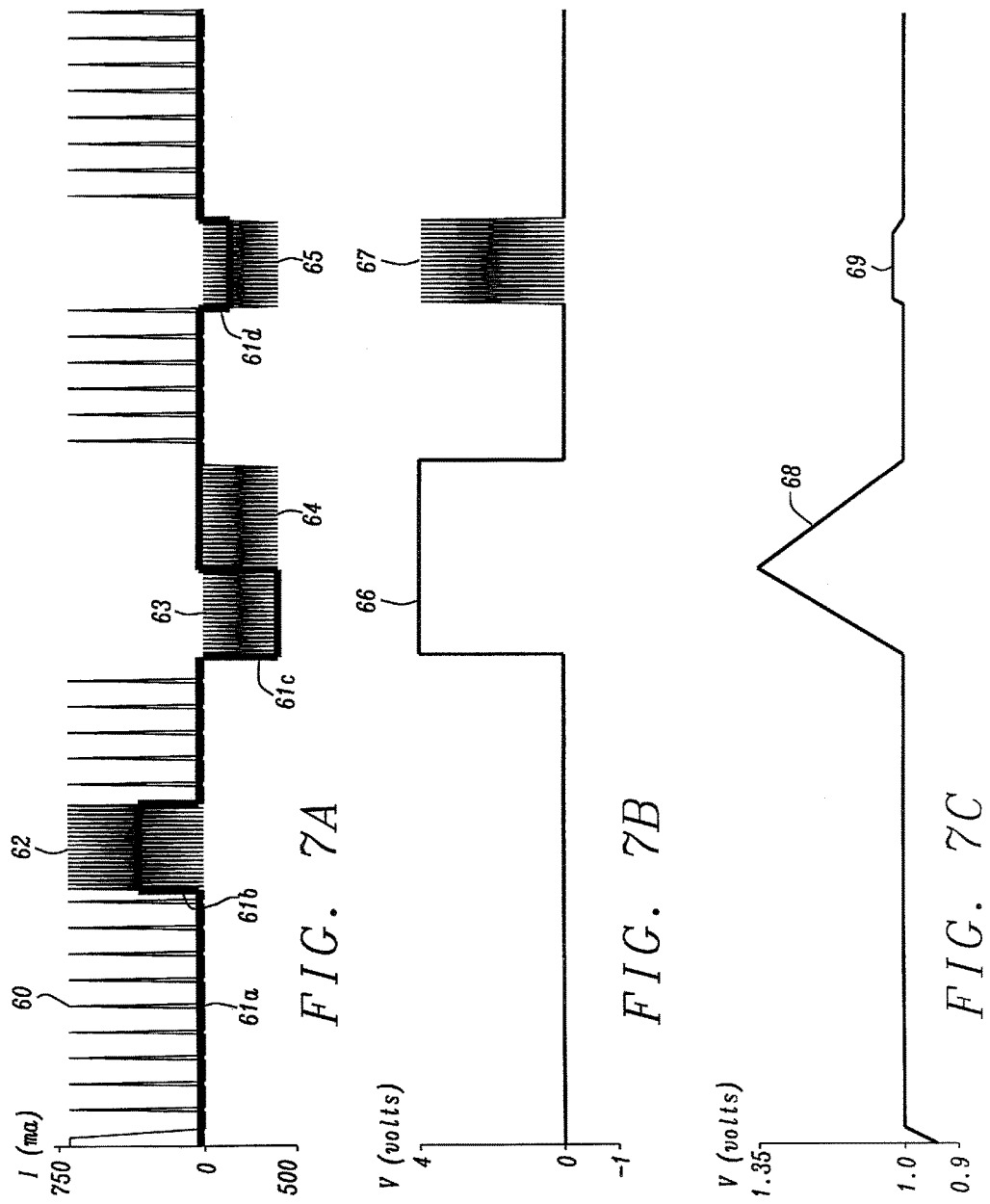

NEGATIVE CURRENT CLOCKING

This application is related to U.S. Pat. No. 9,379,610 issued on Jun. 28, 2016 titled "Buck Variable Negative Current", which is assigned to a common assignee and which is herein incorporated by reference in its entirety.

TECHNICAL FIELD

The present disclosure is related to power sources and in particular to switching mode power supplies comprising buck, boost and buck-boost supplies

BACKGROUND

A switching mode power supply (SMPS) converts power from a source, for instance Vdd on an integrated circuit chip into a voltage or current to be used to power a portion of the circuits on that integrated circuit chip. Switching mode power supplies comprise buck, boost and buck-boost power converters. The buck converter stores energy into an inductor and provides an output voltage between ground and the source voltage. The boost converter stores energy into an inductor and provides an output greater than source voltage and the buck-boost converter produces an output that is a negative voltage.

Focusing on a buck converter, the buck converter generates a pulse width modulated (PWM) switching voltage at the LX node shown in FIG. 1, which is then filtered by an inductor L1. Generally, buck converters operate in one of two modes (1) PWM mode at a fixed frequency or (2) pulse frequency modulation (PFM) mode where the frequency is allowed to change with load current.

Typically the PFM mode is used for low-power modes of operation and can be highly efficient. In the PFM mode, the PMOS transistor P1 is typically turned on when the output voltage falls below a low threshold. The PMOS transistor is then turned off when the current in the inductor rises above a fixed limit, or if the output voltage rises above an upper threshold. When the PMOS transistor P1 is turned off the current in the inductor continues to flow, until the inductor is discharged. This current must be supplied from ground. This can be done using a diode, but the voltage drop across the diode reduces the efficiency of the buck converter. Therefore, most high efficiency buck converters use an NMOS transistor N1, directly controlled by the buck control circuitry, and when the PMOS transistor P1 turns off, the NMOS transistor N1 is turned on.

If the load is very low, the buck may only need to switch at very low frequency to supply the output current. If the NMOS transistor is left on until the PMOS transistor is triggered again, the current in the inductor will go negative, the NMOS transistor will end up discharging the output of the buck converter and power will be wasted. Instead the NMOS transistor is turned off once the current in the inductor reaches zero current, which is typically referred to as an active diode behavior. In one common implementation of a buck converter, the active diode function is implemented by measuring the voltage across the NMOS transistor. If the voltage at the LX node is negative, the current is still positive, and the NMOS transistor is kept on. But once the voltage at the LX node goes above ground, the NMOS transistor is turned off.

In US 2006/0279970 A1 (Kernahan) a control system and a method are directed to simultaneously regulating the operation of a plurality of different types of switching power regulators including not having the regulator feeding current back to the supply. U.S. Pat. No. 8,222,879 B2 (Nguyan) is directed to a circuit that includes a buck voltage regulator couple to an active current modulator, which is operative to detect negative current in the low side switch of the voltage regulator. In U.S. Pat. No. 7,443,699 B2 (Lhermite) a power supply controller is directed to a negative current of a power transistor to detect a point for enabling the power transistor when driving an inductor. U.S. Pat. No. 7,095,220 B2 (Kernahan) is directed to a method of controlling an operation of a switching power converter which includes a first and second series connected transistors and including the handling of "negative" current flow.

SUMMARY

It is an objective of the present disclosure to control the NMOS transistor of the buck switching mode power supply (SMPS) to allow the transistor to pass negative current (current flowing in a direction opposite normal current flow) if the output voltage is higher than the intended output voltage.

It is also an objective of the present disclosure to compare the output voltage to a target voltage of the buck SMPS and to generate a positive reference voltage with respect to ground against which to compare the voltage at the LX node located at the connection between the PMOS transistor and the NMOS transistor.

It is still an objective of the present disclosure to turn off the NMOS transistor of the buck SMPS when the LX voltage rises above the positive reference voltage.

It is yet another objective of the present disclosure to clock the buck SMPS when the output of the buck converter rises higher than an input reference voltage.

It is also yet another objective of the present disclosure to request from digital control circuitry a clock when the buck SMPS goes into an overvoltage.

It is further an objective of the present disclosure to locally generate a clock when the buck SMPS goes into an overvoltage.

It is still further an objective of the present disclosure to generate a clock with a frequency that is proportional to the difference between the output voltage of the buck SMPS and the input reference voltage.

The buck switching mode power supply (SMPS) comprises an inductor, a PMOS transistor switch coupled to a supply voltage and an NMOS transistor that operates as an active diode, wherein the NMOS transistor can be turned off when current through the inductor reaches zero. The PMOS transistor is controlled to an on state by a clock, and when the PMOS transistor is on, energy is stored in the inductor. When the PMOS transistor is turned off, the NMOS transistor is turned on, wherein current continues to flow into the inductor from circuit ground until the current in the inductor drops to zero. If the NMOS transistor is turned off when the inductor current reaches zero, then there is no negative current flow. It should be noted that the current is negative only with respect to the direction of the current flow in which 'negative current' flows from the inductor to ground.

The buck power supply can operate in a pulse width modulation (PWM) mode or a pulse frequency modulation (PFM) mode depending upon the usage of the buck power supply, wherein the PFM mode is preferred for low power operations. In PWM mode the buck power supply can sink as well as source current at the LX node. This means the buck power supply can discharge the output if it rises too high, which can happen for many reasons. Two common reasons are when a load is removed, the inductor takes time to discharge causing the output voltage to overshoot, and when a current is injected into the buck power supply output. Another reason is when the target voltage for the buck power supply is reduced while the power supply is running. Now the buck must discharge its own output to bring the voltage down.

In PFM mode, the buck power supply is unable to sink current, and cannot discharge the output if it rises too high. The active diode prevents the NMOS from passing current to ground. If the buck power supply is allowed to pass negative current when the output voltage is too high, the power supply is then able to discharge its output. However, traditional PFM loops only clock the output devices when a comparator detects the output is lower than the input voltage. In the situation where the output is high the buck power supply will never clock. Therefore, although the power supply is able to pass negative current each time the output clocks, the output is not clocking, and no negative current flows.

In PWM the PMOS output transistor is controlled by a clock. Whenever the PMOS is not on the NMOS output transistor is controlled on. This leads to continuous current in the output devices when load devices are present, but when the load is removed the buck power supply output current oscillates around zero, which limits the efficiency of the buck at low output currents. When in PFM mode, the buck power supply output is allowed to go high impedance. Once the power supply has delivered an amount of charge to the output, the PMOS and NMOS pass-devices are both turned off. They then remain off until the load has discharged the output to the threshold voltage required to turn the PMOS on again. Since the buck power supply operating in PFM mode never passes negative current, and only switches when required a very high efficiency may be achieved at low output currents.

The key disadvantage of this system is that the buck power supply cannot discharge its own output if it goes over-voltage for any reason. This leads to complex control system that is required PWM mode for high loads, for dynamically changing output voltages, and then switching to PFM for low load conditions. These schemes require sensing systems to decide which mode to operate in. Therefore there is a large benefit to any system that can fully regulate in PFM mode.

In a typical PFM buck power supply the active diode is monitored for the voltage across the NMOS transistor to prevent negative current (current from the buck power supply output to ground). When the voltage across the NMOS transistor goes from negative to positive, the current has changed direction from positive to negative, thus a simple zero-crossing comparator can control the NMOS transistor. If the zero-cross comparator compares the LX voltage, not with ground directly, but with another voltage, the current at which turns the NMOS transistor off can be varied.

The simplest implementation is that, if the output voltage is higher than the input voltage, the active diode behaves as a negative current limit. In this case, the NMOS transistor turns off only once a significant amount of negative current is flowing. The PMOS is then turned back on, and turned off once the current reaches the positive current limit, and the positive current limit may be reduced, possibly to zero. This change allows the buck power supply to draw current from the output each time it clocks. However, the loop will not clock each time since it is normally controlled by the PFM comparator which only fires when the output is lower than the input voltage.

There are several embodiments that will allow negative current to flow from the buck power supply. The first embodiment is to clock the buck power supply with an over-voltage signal, wherein the power supply would not be able to stop clocking and inter high impedance. A second embodiment is to provide a clock when the output voltage is high. The clock is created by the digital control circuitry, wherein the clock can run at a lower frequency than the PWM or system clock causing the buck power supply to clock. A third embodiment uses a clock generated by a local oscillator in which the frequency of the local oscillator is controlled by a magnitude of the over-voltage. Therefore as the output voltage increased the frequency of the local oscillator would increase. Since during each cycle a fixed amount of charge is removed from the output, the higher clock rate would increase the current flow from the output.

BRIEF DESCRIPTION OF THE DRAWINGS

This invention will be described with reference to the accompanying drawings, wherein:

FIGS. 7A, B and C are diagrams of simulated waveforms of the buck power supply of the present disclosure.

DETAILED DESCRIPTION

Figure 1:
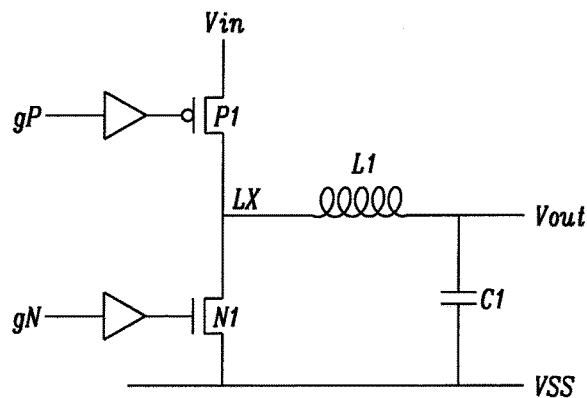
FIG. 1 is a schematic diagram of a basic buck type power supply of prior art.
Figure 2:
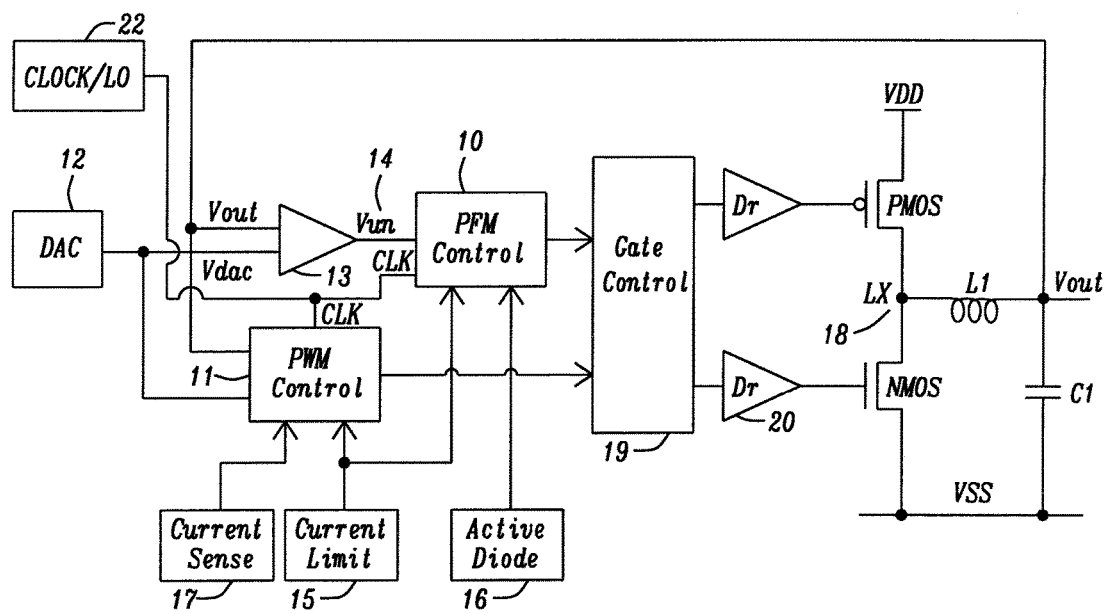
FIG. 2 is a block diagram of the buck SMPS of the present disclosure.

In FIG. 2 is a block diagram of the buck SMPS circuit of the present disclosure, wherein a PMOS transistor is connected to a NMOS transistor at node LX between Vdd and Vss. An inductor L1 is connected between node LX and the output of the buck SMPS circuit, and a capacitor C1 is connected between the output of the buck SMPS and VSS. Charging the inductor from Vdd provides the energy to establish the buck SMPS, which has the capability of operating in PFM mode and PWM mode as signified by PFM control 10 and PWM mode as signified by PWM control 11. A DAC 12 is used to create a target for the output voltage, Vout, of the buck SMPS. The PFM control 10 and the PWM control 11 couple to the gate control 19, which feed the gate drivers 20 that drive the gates of the PMOS and NMOS transistors. A clock/local oscillator 22 is connected to the PFM control 10 and the PWM control 11 to the transmit a clock generated by the clock/local oscillator 22 to the PFM control 10 and the PWM control 11.

In PFM mode the output voltage, Vout, is fed back and compared with the DAC 12 output voltage Vdac in comparator 13. If Vout is found to be lower than Vdac, an under voltage indicator Vun 14 is set by the comparator 13 and coupled to the PFM control circuit 10 to turn on the PMOS transistor. Information from current limit 15 is used by PFM control 10 to turn off the PMOS transistor and turn on the NMOS transistor. When the current in the NMOS transistor reaches zero, the active diode 16 turns off the NMOS transistor and node LX 18 goes into high impedance where both the PMOS and the NMOS transistors are turned off.

Figure 3:
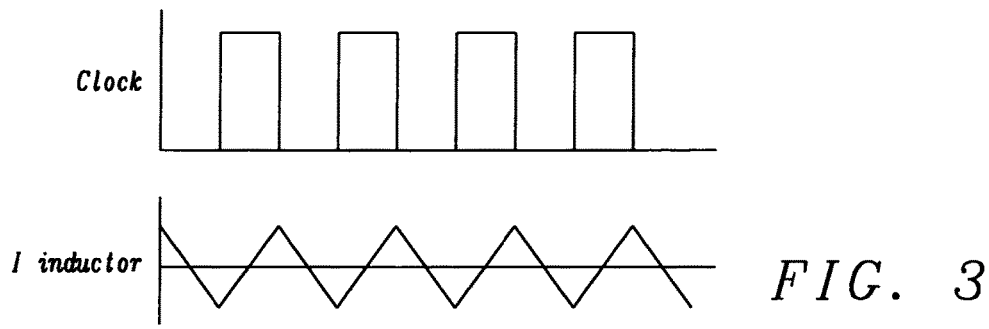
FIG. 3 is a diagram of a clock and inductor current waveforms in PWM mode of the present disclosure.

In PWM mode the output voltage, Vout, of the buck SMPS is fed back and connected to PWM control 11 along with the output of the DAC 12. The PWM controller turns on the PMOS transistor using a clock wherein the NMOS transistor is off when the PMOS transistor is on. The PWM controller uses Vout, Vdac and current sense to determine when to turn off the PMOS transistor In FIG. 3 is shown a current waveform for the inductor in a buck power supply in a PWM mode. The PMOS transistor is controlled by a clock in which the NMOS transistor is turned on when the clock controlling the PMOS transistor is off. This results in saw tooth shaped current through the inductor, wherein the amplitude of the inductor current raises during the clock pulse and falls during the time that the NMOS transistor is turned on (the PMOS transistor clocked off). This leads to continuous current in the output devices, and is fine when a load is present. But when the load is removed the buck output current oscillates around zero. This limits the efficiency of the buck at low output currents.

Figure 4:
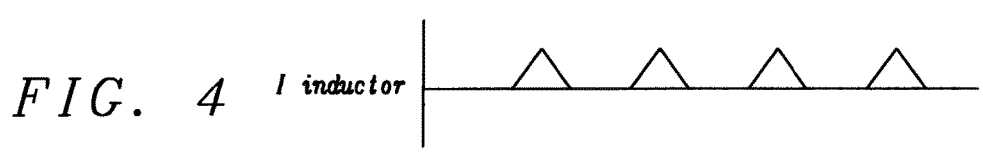
FIG. 4 is a diagram of the waveforms of the output voltage and inductor current in PFM mode of the present disclosure.

In FIG. 4 is shown the waveforms for the output voltage, Vout, and the inductor current, Linductor, for a buck power supply in PFM mode. The buck power supply output is allowed to go high impedance once an amount of charge has been delivered to the output pass-devices, and the PMOS and NMOS transistors are both turned off. The PMOS and NMOS transistors remain off until the load has discharged the output to the threshold voltage required to turn the PMOS on again.

Figure 5A:
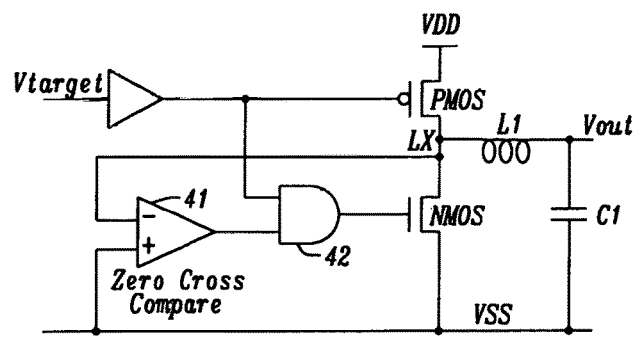
FIGS. 5A and 5B are schematic diagrams of the monitoring of voltage across the NMOS transistor in the PFM buck power supply of the present disclosure.
Figure 5B:
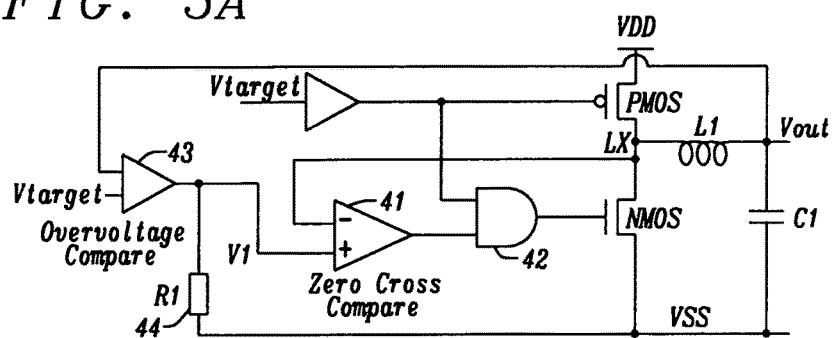

In the circuit shown in FIG. 5A, a simple zero-crossing comparator controls the NMOS transistor. An active diode block in a PFM buck power supply monitors the voltage across the NMOS transistor to prevent negative current from flowing, that is, current from the buck power supply output to ground. When the voltage across the NMOS transistor goes from a negative to a positive voltage, the current has changed direction from positive to negative. If the zero-cross comparator 41 compares the LX voltage, not with ground directly, but with another voltage, for example V1 shown in FIG. 5B, the current at which the NMOS transistor turns off can be varied. As shown in the related U.S. Pat. No. 9,379,610 (610), the overvoltage detection circuit has a an overvoltage comparator 43 that is connected to receive the output voltage Vout, of the buck SMPS and the target input voltage Vtarget. The comparator compares the output voltage Vout, and the target input voltage Vtarget to determine that the output voltage Vout is greater than or less than the target input voltage Vtarget. If output voltage Vout is greater than the target input voltage Vtarget, the zero-crossing comparator functions as a negative current limit for the NMOS transistor. If output voltage Vout is less than the target input voltage Vtarget, the zero-crossing comparator performs its zero-crossing function controlling deactivation of the NMOS transistor when the LX voltage reaches zero volts. The output of the overvoltage comparator 43 causes a voltage drop across the resistor 44 that forms the voltage V1. The voltage V1 is applied to the positive input of the zero crossing comparator 41 for comparison with the LX voltage. The output of the comparator 43 causes a voltage drop across the resistor 44 that is connected to the positive input of the zero crossing comparator 41. This compares the voltage at the LX node to another voltage instead of circuit ground shown in FIG. 5A, and the current at which the NMOS transistor turns off can be varied by the modification of the resistor 44.

When the output of the zero crossing comparator 41 switches voltage polarity, the current in the NMOS transistor has switched from current flowing from circuit ground (Vss) into the buck SMPS to current flowing from the buck SMPS into circuit ground (called negative current) and the NMOS transistor is turned off by the AND circuit 42. Thus excess charge builds up on the output of the buck SMPS circuit with no place to discharge the stored charge from the SMPS. The overvoltage comparator circuit 43 compares the output voltage Vout to the input voltage Vtarget and creates a current that flows through resistor 44 that allows the threshold of zero crossing comparator 41 to raise an amount to permit some of the excess current that has built up in the buck SMPS to be conducted each cycle by the NMOS transistor circuit ground. If each time the NMOS transistor is turned on a small amount of excess current is bled away efficiency of the buck SMPS is reduced. This inefficiency can be somewhat negated by implementing a small dead zone so that a small error at the buck SMPS output Vout does not cause an offset to be added to the active diode threshold. An alternative is replacing the overvoltage comparator circuit 43 with an amplifier. The amount of current that can be discharged to circuit ground is proportional to the amount of overvoltage present at the output Vout of the buck SMPS. Either a comparator or an amplifier provides a mechanism to discharge excess current to circuit ground.

In the simplest implementation, if the output voltage is higher than the DAC voltage, the active diode instead behaves as a negative current limit. In this case, the NMOS transistor turns off once a significant negative current is flowing. The PMOS is then turned back on, and turned off once the current reaches the positive current limit. The positive current limit may be reduced in this case, possibly to zero. This allows the buck power supply to draw current from the output each time it clocks in PWM mode or when the PFM comparator is triggered when the output is lower than the DAC voltage.

Figure 6A:
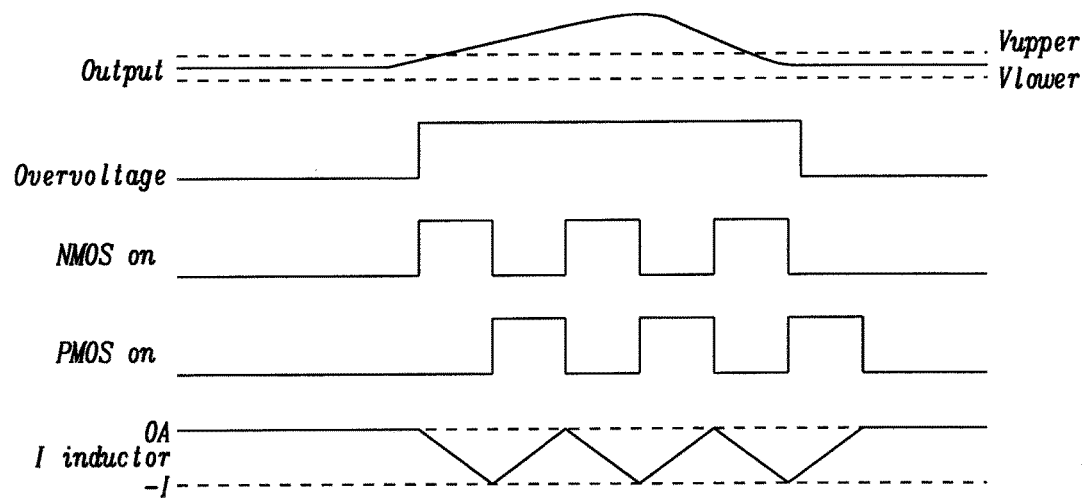
FIGS. 6A and 6B are diagrams of signals that are created to remedy an overvoltage in a PFM buck power supply of the present disclosure.

The diagram in FIG. 6A shows waveforms for the first embodiment in which an over-voltage signal is applied to a buck power supply. Here the buck supply is initially unloaded and the output voltage sits just above the input voltage, Vlower. An external source causes the buck output voltage to rise and it passes the over-voltage threshold, Vupper. This in turn causes the over-voltage comparator to trigger and the buck supply enters negative current mode, which causes the active diode threshold to move down and the inductor current $I_{inductor}$ change from 0 A to a strong negative current −I, for instance −500 mA. The positive current limit is reduced down to 0 A while the overvoltage comparator is set. The positive current limit change is latched, and is only cleared on a positive current limit event when the over-voltage comparator has cleared.

The over-voltage causes the NMOS transistor to turn on and the inductor current to flow from the inductor to ground through the NMOS transistor. Once the current reaches a negative current limit, the NMOS transistor turns off and the PMOS transistor turns on. The "negative current" limit is a predetermined amount that is based on providing a safe operating condition for the output device. The current then begins to increase, becoming less negative. If the overvoltage is active, the buck supply is not allowed to go into high impedance. Therefore, once the inductor current reaches 0A, the PMOS transistor turns off and the NMOS transistor turns back on again. Eventually the output is discharged and the overvoltage condition is cleared. The NMOS transistor is no longer triggered, and the negative current limit is returned to 0 A (the NMOS transistor is acting as an active diode again). The PMOS turns off at 0V and the positive current limit is returned to the normal value. The NMOS is not triggered again and the buck power supply is allowed to go high impedance. The phrase "active diode" relates to how the NMOS transistor is controlled in normal mode, wherein the NMOS transistor is turned off when the current flowing through the NMOS transistor reaches zero.

In FIG. 6A either the PMOS transistor or the NMOS transistor is turned on by a clock. In the PMOS case, when the PMOS transistor is triggered by the clock, the PMOS transistor provides current up to the positive current limit shown for inductor current. Then the PMOS transistor turns off and the NMOS transistor turns on. The NMOS transistor then sinks current down to the negative current limit, and the PMOS transistor is turned on again until the positive current limit is reached. This continues until the over-voltage is cleared. The number of cycles of turning on and off of the PMOS transistor and then the NMOS transistor depends on the magnitude of the over-voltage. The positive current limit can be reduced with the over-voltage signal. Once the over-voltage signal clears, the negative current is then cleared, and the NMOS transistor reverts to an active diode. The buck power supply then turns off the NMOS once the current reaches zero and the output enters high-impedance At this point the buck power supply ceases to clock until either an under or over voltage condition occurs. While the over-voltage is present, the buck power supply is not be able to go into high-impedance or stop clocking A second embodiment of the present disclosure provides a clock when the output is at a high voltage. This clock is created by the control circuitry, the clock can run at a lower frequency than the normal PWM mode or system clock, and causes the buck power supply to clock on the NMOS transistor first. The NMOS transistor in turn can stay on until a negative current limit is hit. The NMOS transistor then turns off and the PMOS transistor turns on. The buck power supply then turns the PMOS transistor off once the PMOS transistor current reaches zero current.

A third and similar embodiment establishes a clock from a local oscillator. This could be simpler and requires lower power than using a clock from the control circuitry. A variant on this embodiment is to use a clock from a local oscillator where the frequency was controlled by the magnitude of the over-voltage. In this case, as the output voltage increased, so the frequency would increase. As each clock cycle removes a fixed amount of charge from the output, the higher clock rate would increase the current flow from the output.

Figure 6B:
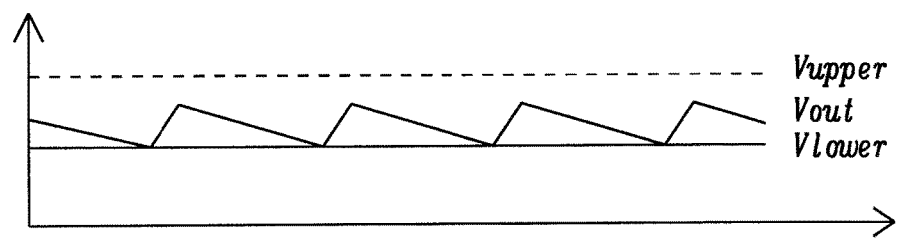

When operating normally the buck power regulator turns on the PMOS transistor whenever the output voltage, Vout, falls below Vdac, shown as Vlower in FIG. 6B. The PMOS transistor charges the coil. Once the PMOS transistor turns off the coil starts to discharge, and when the coil current reaches zero, the output is set to high impedance. The output voltage discharges slowly under the effect of the load current. The effect of this pulse of charge from the coil creates a voltage ripple on the output. The threshold voltage, Vlower, is chosen to be the nominal target voltage for the buck and the effect of the ripple is ignored.

If the output voltage rises, the buck power regulator cannot prevent the rise until the output voltage rises above Vupper. Once this happens the buck regulator detects an overvoltage, which the buck power regulator can act to discharge and bring the buck regulator output voltage back down as previously discussed with FIG. 6A.

Therefore, to minimize the range of output voltage of the buck power regulator, Vupper should be as close as possible to Vlower. However, the buck power regulator should not trigger overvoltage caused by the ripple voltage at the output, and Vupper must be set to carefully minimize the output regulation range, while making sure the buck operates correctly.

In FIGS. 7A, 7B and 7C are the results of a simulation that demonstrates the operation of the present disclosure. Referring to FIG. 7A, the inductor current 60, 62, 63, 64, and 65 in the buck power supply of the present disclosure is shown for different load conditions 61a, 61b, 61c and 61d (indicated as a thick dark line). Initially the buck power supply is lightly loaded 61a wherein the output of the buck power supply is discontinuous in a high efficiency state, where the load condition 61a is shown close to zero inductor current. Then a positive load is applied 61b, which is satisfied through regulation of the power supply 62. Next a strong negative load 61c is applied that is greater than the negative current limit. The output voltage is raised above the regulated voltage 68 in FIG. 7C, and the buck power supply remains in negative current mode 64 until the overvoltage is discharged by negative current. Then a lighter negative load 61d is applied to the buck power supply, which is easily satisfied in discontinuous negative mode 65. Pulse 66 in FIG. 7B is the overvoltage that is continuously high while current 63 in FIG. 7A is lower than coil current 64, which makes the output voltage 68 in FIG. 7C higher than the regulated value. The burst voltage 67 in FIG. 7B is the overvoltage signal that is toggling to request short pulses of negative current 65 in FIG. 7A as each short pulse brings the voltage 69 in FIG. 7C back into regulation.

It should be noted that the present disclosure is applicable to switching mode power supplies, which include buck, boost and buck-boost types, and is not restricted to any specific type of switching mode power supplies, or the pass-devices made from various technologies including external pass devices not integrated into an integrated circuit chip.

While the invention has been particularly shown and described with reference to preferred embodiments thereof, it will be understood by those skilled in the art that various changes in form and details may be made without departing from the spirit and scope of the invention.

What is claimed is:

1. An overvoltage discharge circuit in communication with a switch mode power supply (SMPS) for eliminating an overvoltage at an output of the SMPS, comprising:
   an overvoltage detection circuit coupled to the SMPS for receiving an indication of an output voltage and for receiving a target input voltage, and configured for determining that the output voltage is greater than the target input voltage and providing an overvoltage indication signal, the overvoltage detection circuit is configured for adjusting the overvoltage indication signal to a voltage that is not circuit ground;
   a zero crossing comparator circuit coupled to the overvoltage detection circuit for receiving the overvoltage indication signal, coupled to a common connection of a first switch and a second switch included in the SMPS for receiving a voltage level present at the common connection between the first and second switch, configured for generating a negative current limit/active diode select signal having a first voltage level when the overvoltage indication signal designates an overvoltage condition at the output of the SMPS indicating that the negative current/active diode select signal is activated, generating a second voltage level that is approximately ground when the voltage level at the common connection is approximately equal to the zero voltage level indicating the second switch is activated; and a switch control circuit coupled to the zero crossing comparator circuit and configured for generating a switch activation/deactivation signal indicating that the second switch is to be activated when the voltage at the common connection is greater than the first voltage level;

wherein adjusting the overvoltage indication signal to the voltage that is not circuit ground varies the current at which the second switch turns off;

wherein when the overvoltage indication signal indicates an overvoltage at the output of the SMPS, the switch control circuit activates the second switch to sink excess current to decrease the overvoltage at the output of the SMPS.

2. The overvoltage discharge circuit of claim 1 wherein when the overvoltage is eliminated at the common connection between the first and second switch, the SMPS resumes a pulse frequency mode of operation and the negative current limit/active diode select signal indicates that the zero crossing comparator circuit is functioning as an active diode.

3. The overvoltage discharge circuit of claim 1 wherein when the negative current indicator signal indicates the voltage at the common connection between the first and second switch is greater than the first level indicating negative current through the second switch, the switch control circuit activates a clock circuit included in the SMPS for activating and deactivating the first and second switches until the output voltage is less than an upper limit voltage level for the output voltage of the SMPS.

4. The overvoltage discharge circuit of claim 3 wherein the clock circuit operates at a frequency less than a pulse width modulation frequency and activates the second switch prior to activating the first switch.

5. The overvoltage discharge circuit of claim 3 wherein the clock frequency is controlled by an amplitude of the overvoltage at the output of the SMPS.

6. The overvoltage discharge circuit of claim 3 wherein the upper limit voltage level for the output voltage of the SMPS is greater than an amplitude of a ripple voltage at the output of the SMPS.

7. The overvoltage discharge circuit of claim 1 wherein said SMPS is a buck type power supply.

8. The overvoltage discharge circuit of claim 1 wherein said SMPS is a boost type power supply.

9. The overvoltage discharge circuit of claim 1 wherein the SMPS is a buck-boost type power supply.

10. A switch mode power supply (SMPS) comprising:
an overvoltage discharge circuit for eliminating an overvoltage at an output of the SMPS, comprising:
an overvoltage detection circuit coupled to the SMPS for receiving an indication of an output voltage and for receiving a target input voltage, and configured for determining that the output voltage is greater than the target input voltage and providing an overvoltage indication signal, the overvoltage detection circuit is configured for adjusting the overvoltage indication signal to a voltage that is not circuit ground;
a zero crossing comparator circuit coupled to the overvoltage detection circuit for receiving the overvoltage indication signal, coupled to a common connection of a first switch and a second switch included in the SMPS for receiving a voltage level present at the common connection between the first and second switch, configured for generating a negative current limit/active diode select signal having a first voltage level when the overvoltage indication signal designates an overvoltage condition at the output of the SMPS indicating that the negative current limit/active diode select signal is activated, generating a second voltage level that is approximately ground when the voltage level at the common connection is approximately equal to the zero voltage level indicating the second switch is activated; and a switch control circuit coupled to the zero crossing comparator circuit and configured for generating a switch activation/deactivation signal indicating that the second switch is to be activated when the voltage at the common connection is greater than the first voltage level;

wherein adjusting the overvoltage indication signal to the voltage that is not circuit ground varies the current at which the second switch turns off;

wherein when the overvoltage indication signal indicates an overvoltage at the output of the SMPS, the switch control circuit activates the second switch to sink excess current to decrease the overvoltage at the output of the SMPS.

11. The switch mode power supply of claim 10 wherein when the overvoltage is eliminated at the common connection between the first and second switch, the SMPS resumes a pulse frequency mode of operation and the negative current limit/active diode select signal indicates that the zero crossing comparator circuit is functioning as an active diode.

12. The switch mode power supply of claim 10 wherein when the negative current indicator signal indicates the voltage at the common connection between the first and second switch is greater than the first level indicating negative current through the second switch, the switch control circuit activates a clock circuit included in the SMPS for activating and deactivating the first and second switches until the output voltage is less than an upper limit voltage level for the output voltage of the SMPS.

13. The switch mode power supply of claim 12 wherein the clock circuit operates at a frequency less than a pulse width modulation frequency and activates the second switch prior to activating the first switch.

14. The switch mode power supply of claim 12 wherein the clock frequency is controlled by an amplitude of the overvoltage at the output of the SMPS.

15. The switch mode power supply of claim 12 wherein the upper limit voltage level for the output voltage of the SMPS is greater than an amplitude of a ripple voltage at the output of the SMPS.

16. The switch mode power supply of claim 10 wherein the SMPS is a buck type power supply.

17. The switch mode power supply of claim 10 wherein the SMPS is a boost type power supply.

18. The switch mode power supply of claim 10 wherein the SMPS is a buck-boost type power supply.

19. A method for eliminating an overvoltage at an output of a switch mode power supply (SMPS), comprising the steps of:
detecting an overvoltage by determining that the output voltage of the SMPS is greater than a target input voltage; and providing
when the output voltage is greater than the target input voltage activating an overvoltage indication signal;
adjusting the overvoltage indication signal to a voltage that is not circuit ground such that a current at which a current limit switch turns off is varied;
generating a negative current limit/active diode select signal having a first voltage level when the overvoltage indication signal designates an overvoltage condition at the output of the SMPS indicating that the negative current limit/active diode select signal is activated;

generating a second voltage level that is approximately ground when the voltage level at the common connection is approximately equal to the zero voltage level indicating the negative current limit/active diode select signal is activated;

generating a switch activation/deactivation signal indicating that the current limit switch is to be activated when the voltage at the common connection is greater than the first voltage level; and when the overvoltage indication signal indicates an overvoltage at the output of the SMPS, activating the current limit switch to sink excess current to decrease the overvoltage at the output of the SMPS.

20. The method of claim 19 further comprising the step of resuming by the SMPS resumes a pulse frequency mode of operation and generating the negative current limit/active diode select signal indicating the active diode is activated, when the overvoltage is eliminated at the output of the SMPS.

21. The method of claim 19 further comprising activating a clock circuit included in the SMPS for activating and deactivating the first and current limit switches until the output voltage is less than an upper limit voltage level for the output voltage of the SMPS, when the negative current indicator signal indicates the voltage at the common connection between the first and current limit switch is greater than the first level indicating negative current through the current limit switch.

22. The method of claim 21 wherein activating the clock circuit comprises the steps of:

operating the clock at a frequency less than a pulse width modulation frequency and activating the current limit switch prior to activating a power switch.

23. The method of claim 21 wherein activating the clock circuit comprises the step of controlling the clock frequency by an amplitude of the overvoltage at the output of the SMPS.

24. The method of claim 21 wherein the upper limit voltage level for the output voltage of the SMPS is greater than an amplitude of a ripple voltage at the output of the SMPS.

25. The method of claim 19 wherein said SMPS is a buck type power supply.

26. The method of claim 19 wherein said SMPS is a boost type power supply.

27. The method of claim 19 wherein the SMPS is a buck-boost type power supply.

\* \* \* \* \*